United States Patent [19]
Moyer

[11] 3,839,169
[45] Oct. 1, 1974

[54] PHOTOOXIDIZING ORGANIC CONTAMINANTS IN AQUEOUS BRINE SOLUTIONS

[75] Inventor: John R. Moyer, Midland, Mich.

[73] Assignee: The Dow Chemical Company, Midland, Mich.

[22] Filed: May 31, 1973

[21] Appl. No.: 365,781

Related U.S. Application Data

[63] Continuation of Ser. No. 170,977, Aug. 11, 1971, abandoned, which is a continuation-in-part of Ser. No. 23,469, March 27, 1970, abandoned.

[52] U.S. Cl..................... 204/158 HA, 204/157.1 R
[51] Int. Cl............................................. B01j 1/10
[58] Field of Search............................ 204/158 HA

[56] References Cited
UNITED STATES PATENTS

3,469,493   3/1972   Meines et al................ 204/158 HA

Primary Examiner—Howard S. Williams
Attorney, Agent, or Firm—Bruce M. Kanuch; Stephen R. Wright

[57] ABSTRACT

Disclosed herein is a novel, relatively fast method for reducing the concentration of water soluble carboxylic contaminants, (e.g., acetate ion, acetic acid, or salts thereof) in chloride containing brines. The method comprises contacting the brine stream with chlorine and ultraviolet light and controlling the pH of the brine.

14 Claims, No Drawings

PHOTOOXIDIZING ORGANIC CONTAMINANTS IN AQUEOUS BRINE SOLUTIONS

CROSS-REFERENCE TO RELATED APPLICATIONS

This is a continuation of application Ser. No. 170,977, filed Aug. 11, 1971, which in turn is a continuation-in-part of Ser. No. 23,469, filed Mar. 27, 1970, both now abandoned.

BACKGROUND OF INVENTION

Chlorine has long been used to treat water supplies. In such applications the chlorine functions primarily as a disinfectant with little oxidation of dissolved organic materials being accomplished. The work of Meiners (see "Chemical & Engineering News," July 14, 1969, page 98) shows dissolved organic materials can be removed from water by contracting it with chlorine in combination with ultraviolet radiation. The concentration in the water of organic materials such as phenol is thereby reduced. The Meiners treatment is relatively ineffective, however, with certain organic contaminants such as ethanol and carboxylic acids such as acetic acid. Also the predominate reaction, as indicated by research, requires about 4 moles of chlorine to remove 1 mole of acetic acid.

An object of the invention is to provide a relatively fast method for reducing the concentration of carboxylic materials (such as acetic ion) in aqueous brines. A particular advantage of the process arises in that less than 1.5 moles of chlorine are required to consume a mole of carboxylated organic materials instead of the much larger amount which would be equivalent to the total oxygen demand of the organic material (4.0 moles in the case of acetic acid). In addition, the process produces varying amounts of chlorinated hydrocarbons as a by-product. These hydrocarbons are commerically valuable and are readily separated from the chlorinated aqueous brine.

DESCRIPTION OF THE INVENTION

The present invention comprises contacting an aqueous brine solution containing carboxylic species with chlorine, while irradiating the solution with light having a wave length of less than 3,600 angstroms. The main by-products of the process, $CO_2$ and chlorinated hydrocarbons, may be separated and recovered by volatilization from the chlorinated brine.

It has been found that the chlorine present in the brine has a critical, beneficial effect on the ultraviolet catalyzed chlorination process. An entirely different reaction predominates — on which is relatively fast and which requires only 1–1.5 moles of chlorine per mole of contaminant removed.

During the process the acidity of the brine is controlled so that the brine pH does not rise more than about one unit above the $pK_a$ value of the carboxylic species present, and does not fall to less than about 2.5 units below the $pK_a$ value of the carboxylic species; i.e., the pH is controlled so that:

$$pK_a - 2.5 \leq pH \leq pK_a + 1$$

The term "$pK_a$" or "$pK_a$ value" as used herein is defined as the negative logarithm (base 10) of the ionization constant ($K_a$) of the carboxylic acid. In determining the $pK_a$ of the carboxylic species in the brine, water soluble salts of carboxylic acids are assumed to have a $pK_a$ similar to the corresponding acid. The $pK_a$ value for acetic acid or salts thereof is taken as about 4.7. Where acetic acid or salts thereof is the carboxylic impurity, the pH of the brine is controlled at from about 2.2 to about 5.7. Preferably, for these impurities, the brine pH is from about 3 to about 5.5.

As used herein, the terms "carboxylic material" or "carboxylic species" refer to carboxylic acids, water-soluble salts thereof, or organic materials which form carboxylic acids when contacted with chlorine, e.g., alkylene glycols and aliphatic alcohols. The term "aqueous brine solution containing a carboxylic material" describes an aqueous brine having water-soluble carboxylic acids, salts thereof, and/or the aforementioned organic precursors of the carboxylic acids dissolved in the brine. Other organic impurities such as ketones, aldehydes, and ethers may also be present. Suitable water-soluble carboxylic acids have a $pK_a$ of from about 2 to about 5, and certain from about two to about 12 carbon atoms. Specific examples of the acids are acetic, propionic, butyric, valeric, hexanoic, chloroacetic acid and chlorinated derivatives of the aliphatic carboxylic acids. Specific examples of materials which are oxidized by chlorine to form carboxylic acids are alcohols such as ethanol, n-propanol and l-decanol, diols such as propylene glycol, diethylene glycol, and butylene glycol. In addition, amines, aldehydes and ketones such as triethylamine, acetal and acetone are oxidized to acetic acid by aqueous chlorine.

Thus, where the organic material desired to be removed from the brine is a carboxylic precursor, the initial contact of the brine with chlorine will oxidize the material to form carboxylic acid. Alternatively, the precursor can be oxidized prior to contact with the chlorine-ultraviolet light process of the present method.

The above acids are generally present in the brine as water-soluble salts. Very good results are obtained where the carboxylic impurity is acetic acid or salts thereof.

Irradiation with light of suitable wave lengths can be accomplished in a variety of ways. The most practical source of ultraviolet light is a mercury arc. Sunlight is also effective in catalyzing the reaction but is of too low intensity for practical use. Because of the intensity of their radiation, medium and high pressure mercury arcs are the preferred sources of ultraviolet radiation for this process. It is not intended, however, to limit the process to their use. The use of either sunlight or low pressure mercury arcs fall under the scope of this invention.

Whatever the light source used, the intensity of the radiation provided to the reaction mixture is from about 0.01 to about 10 watts per cubic foot of the reaction mixture. Preferably, the intensity is about 0.2 to about 2 watts per cubic foot.

The step of contacting the brine with chlorine can be performed in several ways. The brine can be contacted incrementally with an aqueous solution of a hypochlorite (e.g., NaOCl) to achieve the desired chlorination.

Alternatively, the chlorine can be produced "in situ" with the brine serving as electrolyte, graphite serving as cathode, and graphite serving as anode. Another in situ method of contacting the brine with chlorine is to dissolve an alkali metal hypochlorite, (e.g., NaOCl) in the brine while maintaining the brine pH at from about 2.5 to about 5.5.

Solvation of hypochlorite (either as solid or in solution) in the brine is preferably carried out incrementally as concentrations of "dissolved" chlorine in excess of about 20 parts per million (p.p.m.) impede the speed with which the carboxylic acid is consumed. The amount of dissolved chlorine is determined by iodometric titration. The total amount of hypochlorite dissolved should be sufficient to provide from about 1 to about 1.5 moles of chlorine for each mole of carboxylic species or salts thereof present, i.e., the total amount of chlorine provided, including both dissolved and reacted chlorine should be sufficient to provide from about 1 to about 1.5 moles of chlorine per mole of carboxylic species present. In determining the amount of "chlorine" provided by the hypochlorite, it is assumed that each mole of hypochlorite provides 1 mole of chlorine according to the reaction: $NaOCl + 2 HCl \rightarrow Cl_2 + NaCl + H_2O$.

A convenient method of contacting the aqueous brine with chlorine is to bubble gaseous chlorine into the brine. The rate of chlorine addition should be sufficient to provide a residue of "dissolved" yet unreacted chlorine in the brine. In the brine, the size of the chlorine residue may range up to the solubility limitations of the brine at the reaction temperature, i.e., near 100°C the brine may be substantially saturated with respect to "dissolved" chlorine. It is generally preferred to maintain the concentration of dissolved and unreacted chlorine at levels below about 10 p.p.m. Concentrations of dissolved chlorine in excess of 20 p.p.m. tend to impair the rate at which the carboxylic acid is consumed. For example, it has been discovered that in a reaction at 95°C. the concentration of acetate ions is reduced from 1,500 p.p.m. to about 150 p.p.m. in about 0.5 hour where the concentration of dissolved chlorine was maintained at from about 1 to about 5 p.p.m. By contrast, a similar reduction in acetate concentration was only achieved in about 1.5 hours where the chlorine residue varied from about 50 to about 100 p.p.m.

Where the chlorine residue is maintained at from about 1 to about 10 p.p.m., the total amount of chlorine added to the brine is from about 1 to about 1.5 moles per mole of carboxylic species present therein. In adding chlorine, it is assumed that the operator will not add at such a fast rate that chlorine gas passes through the brine and is not dissolved therein.

As the brine is contacted with chlorine and irradiated with light, the brine pH is controlled as described above. Where several different carboxylic acids are present in the brine in determining the $pK_a$ value, it is sufficient to take the "weighted" average of the $pK_a$ values of the individual acids. With carboxyylic impurities commonly found in brine streams (e.g., formate, acetate, and glycolate), the pH of the brine is generally controlled within the range of from about 2.5 to about 5.5. At pH ranges in excess of about 5, a relatively slow reaction occurs in which more than 2.5 moles of chlorine are required to consume 1 mole of carboxylic species. At pH below about 3, the reaction rate is also detrimentally affected.

The present invention can be carried out at temperatures ranging from the freezing point to the boiling point of the brine. Preferably, the process is accomplished at a temperature of 90°C and above. These elevated temperatures result in substantially enhanced reaction rates. Brine temperatures in excess of about 90°C., are also advantageous in that many industrial waste streams contaminated with acetate and similar carboxylates are produced at such temperatures. Therefore, cooling operations are not necessary in order to treat the brine.

The term "brine," as used herein refers to aqueous solutions containing alkali metal or alkaline earth metal chloride in the brine of from about 1 percent up to the saturation point. Where a sodium chloride brine is employed, the concentration by weight of NaCl can range from about 1 to about 25 percent. Other inorganic brines which can be employed are brines containing $MgCl_2$, $CaCl_2$, $LiCl$, $KCl$, $SrCl_2$ and $BaCl_2$ or mixtures thereof.

The utility of the present invention is increased somewhat because of the production therein of chlorinated hydrocarbons as by-products. Where the brine is processed at pH 5, as described above, from about 0.5 to about 0.9 moles of chlorinated hydrocarbons are produced for every mole of $CO_2$ produced. For example, where the brine contains acetate, at pH 4, about 0.9 mole of chlorinated methanes is produced for each mole of $CO_2$ produced. These chlorinated hydrocarbons may be collected and used.

The nature of the chlorinated hydrocarbon produced in the invention generally corresponds to the equation:

$$R - CO_2H + Cl_2 \rightarrow R - Cl + CO_2 + HCl$$

where $R$ is hydrogen or a hydrocarbon group containing from one to 12 carbon atoms. While the major product of the invention is a mono-chlorinated hydrocarbon, di- and tri-chlorinated hydrocarbons are produced in lesser amounts. For example, where the carboxylic species is acetate and the process is carried out at pH 4, the molar ratio of $CO_2:CH_3Cl:CH_2Cl_2:CHCl_3:CCl_4$ is 100:83:4.2:1.4:0.

Where the invention is carried out utilizing brine temperatures in excess of the boiling points of the hydrocarbon by-products, the hydrocarbons will volatilize from the brine as they are produced and can be separated from the $CO_2$ by condensation. At temperatures below the boiling point of the hydrocarbons, a separate process step is required for separation of the hydrocarbons. This separation step can consist, for example, of extraction, blowing out or decantation.

The following examples are set forth to illustrate the present invention:

EXAMPLE 1

A brine containing 20% NaCl and 0.125 percent acetic acid was heated to 50°C. and irradiated with ultraviolet light from a 450 watt mercury arc. Chlorine gas was bubbled into the brine at a rate sufficient to maintain a concentration of chlorine near 0.001 molar (64 p.p.m.) in the brine. The consumption of chlorine was determined periodically by noting the weight loss from a tared cylinder of chlorine. The concentration of acetic acid in solution was determined at the same intervals by means of a Model 915 Total Carbon Analyzer produced by the Process Instrument Division of Beckman Instruments, Inc. The pH of the brine was maintained at a predetermined value by additions of a previously standardized solution of NaOH. Table 1 shows the results from a series of such runs. Within the pH range 3 to 5, the reaction between chlorine and acetic acid is more rapid and requires less chlorine.

TABLE I

Effect of pH upon the UV Chlorination of Acetic Acid

| Run Number | pH | Moles Cl$_2$ added per mole of acetic acid consumed | Moles of acetic acid consumed per hour |
|---|---|---|---|
| 1 | 2.0 | 1.55 | 0.077 |
| 2 | 3.0 | 1.15 | 0.136 |
| 3 | 4.0 | 1.16 | 0.103 |
| 4 | 4.5 | 1.37 | 0.098 |
| 5 | 5.0 | 1.57 | 0.080 |
| 6 | 5.5 | 2.9 | 0.093 |
| 7 | 6.0 | 2.9 | 0.041 |

EXAMPLE 2

4.5 gallons of brine containing 20% NaCl and 0.13% acetic acid was contacted incrementally with a 1.45 molar solution of NaOCl at a rate sufficient to maintain a constant concentration of chlorine (as determined by iodometric titration) near 0.001 molar. The brine was maintained at 100°C. and pH 4–4.5 by adding a solution of HCl during the addition of the NaOCl. A 100 watt mercury arc irradiated the brine during the chlorination. Samples withdrawn at intervals were analyzed for their acetic acid content by means of a Total Carbon Analyzer. The volume of NaOCl solution added was noted as each sample was taken for analysis of acetic acid. The results are given in Table II. Acetic acid is largely removed in about 20 minutes.

TABLE II

The rate of decomposition of acetic acid in brine by UV chlorination (pH 4) at about 100°C.

| Time (Min.) | Acetic Acid Conc. (p.p.m.) | Moles NaOCl Consumed per Mole of Acetic Acid |
|---|---|---|
| 0 | 1325 | — |
| 4 | 1075 | 1.02 |
| 7 | 800 | 0.98 |
| 11 | 625 | 1.10 |
| 14 | 500 | 1.09 |
| 16 | 375 | 1.08 |
| 26 | 225 | 1.17 |
| 32 | 150 | 1.16 |
| 47 | 125 | 1.25 |
| 76 | 75 | 1.23 |

EXAMPLE 3

4.5 gallons of a brine containing 20% NaCl and 0.201 percent chloroacetic acid was contacted incrementally with 250 ml. of a 1.45 molar solution of NaOCl at a rate sufficient to maintain a constant concentration of chlorine (as determined by iodometric titration) near 0.001 molar. The brine temperature was maintained at about 25°C. The pH was held near 3 by additions of a solution of hydrochloric acid. During the addition of the NaOCl solution, the brine was irradiated with a 450 watt mercury arc. Samples of the brine were withdrawn periodically and analyzed for residual chloroacetic acid by means of a Total Carbon Analyzer. The results are given in Table III. They show a reaction between approximately equimolar quantities of NaOCl and chloroacetic acid which gives gaseous products. Good reduction in acid concentration is accomplished.

TABLE III

UV Chlorination of Chloroacetic Acid in Brine

| Time (Hours) | Concentration of ClCH$_2$CO$_2$H (Grams per Liter) | Moles NaOCl Added per Mole of ClCH$_2$CO$_2$H Consumed |
|---|---|---|
| 0 | 2.01 | — |
| 0.55 | 1.654 | 1.15 |
| 0.75 | 1.26 | 1.08 |
| 1.23 | 1.024 | 1.24 |
| 1.75 | 0.63 | 1.17 |
| 2.55 | 0.35 | 1.22 |

EXAMPLE 4

4.5 gallons of a brine containing 20% NaCl and 0.13 percent propionic acid was heated to 50°C. and irradiated by means of a 450 watt mercury lamp. During radiation of the solution, 300 ml. of 1.45 molar NaOCl was added incrementally thereto. The rate of addition was such as to keep the analytical concentration of chlorine near 0.001 molar during the reaction. The pH was 4.

The concentration of propionic acid was monitored by withdrawing samples and determining the Total Organic Carbon content by means of a Total Carbon Analyzer. The results are given in Table IV.

TABLE IV

UV Chlorination of Propionic Acid in Brines

| Time (Hours) | Concentration of EtCO$_2$H (g/l) | Moles NaOCl Added Per Mole of EtCO$_2$H Consumed |
|---|---|---|
| 0 | 1.300 | — |
| 0.18 | 0.97 | 2.23 |
| 0.27 | 0.66 | 1.83 |
| 0.52 | 0.20 | 1.65 |
| 0.75 | 0.09 | 1.62 |

EXAMPLE 5

4.5 Gallons of a brine containing 7% NaCl and 300 ppm propylene glycol was heated to 95°C and irradiated by means of a 100 watt mercury lamp, which due to a wire screen cover transmitted only 35 percent of the emitted light. During radiation, a solution of NaOCl was added to maintain a pH of 4 and a HOCl concentration of 0.0001 molar.

The concentration of propylene glycol was monitored by withdrawing samples and determining the Total Organic Carbon content by means of a Total Carbon Analyzer. The results are given in Table V.

TABLE V

| UV Chlorination of Propylene Glycol in Brine | |
|---|---|
| Time (Hours) | Concentration of Propylene Glycol (ppm) |
| 0 | 300 |
| 1 | 275 |
| 2 | 154 |
| 4 | 51 |

EXAMPLES 6–12

A series of UV-catalyzed chlorinations of acetic acid were carried out in a 4.5 gallon battery jar which was equipped with various control devices. Pneumatic recorder-controllers actuated valves which controlled the rate of addition of reactants so as to maintain a constant pH 4.2 and chlorine concentration in solution between 10 and 15 ppm. A thermostat kept the reaction mixture at 100°C. Each reaction began with 1,000 ppm acetic acid in solution.

The amount of chlorine which was added was determined by adding a solution of NaOCl whose concentration was known. The amount lost in the exit gases was determined by bubbling them through a trap containing potassium iodide. The gas stream was analyzed. Samples of the reaction mixture were analyzed periodically for their acetic acid content by means of a Beckman Total Organic Carbon Analyzer.

It is convenient to express the rate of reaction in terms of a pseudo first order rate constant because, with every other independent variable parameter held constant, the rate of disappearance of acetic acid is proportional to its concentration. That is, $$d(HOAc)/dt = -k(HOAc)$$

where (HOAc) is the concentration of acetic acid, $t$ is time and $k$ is the first order rate constant.

In Table VI, the rate constants, stoichiometry, and gas composition are shown. The stoichiometry changes abruptly with 1% NaCl added. The rate of the reaction increases in proportion of the concentration of chloride ions.

TABLE VI

| Ex. No. | % NaCl | (k (min.$^{-1}$) | Molar Ratio Cl$_2$ Used/HOAc Lost |
|---|---|---|---|
| Comparative A | 0 | 0.0001 | 3.0 |
| Comparative B | 0 | 0.0002 | 4.0 |
| 6 | 1 | 0.0025 | 1.56 |
| 7 | 3 | 0.0043 | 1.28 |
| 8 | 5 | 0.0073 | 1.21 |
| 9 | 10 | 0.0134 | 1.15 |
| 10 | 15 | 0.0185 | 1.12 |
| 11 | 20 | 0.0250 | 1.18 |
| 12 | 25 | 0.0313 | 1.13 |

Also the molar ratio of chloromethanes to CO$_2$ in the product gases was measured for the comparative examples and Example 11. The ratio was about 0.3 for the solutions with no NaCl added but increased to about 0.9 for Example 11, 20% NaCl, indicating that the chloride added changed the basic nature of the reaction.

What is claimed is:

1. In the method of oxidizing dissolved organic compounds containing carboxylic groups in an aqueous solution with chlorine while irradiating the solution with light having a wave length of less than 3,600 A, said aqueous solution containing less than or being substantially free of an amount of chloride ions effective to increase the rate of reaction and reduce the quantity of chloride required to oxidize said organic compounds, the improvement which comprises:

dissolving into said aqueous solution a sufficient quantity of an alkali or alkaline earth metal chloride to provide a sufficient quantity of chloride ions in solution to increase the rate of oxidation and reduce the quantity of chlorine required to oxidize said organic compounds.

2. A process as in claim 1 wherein the pH of the brine is controlled in relation to the pK$_a$ value of the carboxylic impurity so that:

$$pK_a - 2.5 \leq pH \leq pK_a + 1.$$

3. A process as in claim 1 wherein the intensity of the irradiation passed into the brine provides from about 0.01 to about 10 watts of light energy per cubic foot of the reaction mixture.

4. A process as in claim 1 wherein a carboxylic impurity is acetic acid or water-soluble salts thereof.

5. A process as in claim 1 wherein in the reaction mixture from about 1 to about 1.5 moles of chloride are provided for each mole of carboxylic impurity present in the brine.

6. A process as in claim 1 wherein the concentration of chlorine in the brine is maintained up to about 50 parts per million.

7. A process as in claim 1 wherein the temperature of the brine is from about 90°C to about the boiling point of the brine.

8. A process as in claim 1 and including, as an additional step, collecting the chlorinated hydrocarbons produced as a by-product in the process.

9. A process as in claim 1 wherein the alkali or alkaline earth metal chloride is provided in an amount of at least about 1.0 weight percent of the solution.

10. A process as in claim 1 wherein the alkali or alkaline metal chloride is sodium chloride.

11. In the method of oxidizing carboxylic species containing from about two to about 12 carbon atoms and having a pKa value of from about 2 to about 5, dissolved in an aqueous solution containing from about 1 percent by weight to the saturation level of an alkali or alkaline earth metal chloride with chlorine in the presence of light having a wave length of less than about 3,600 A, the improvement which comprises:

maintaining the pH of the solution within a range defined by the formula pKa $-$ 2.5 $\leq$ pH $\leq$ pKa $+$ 1 wherein pKa is the negative logarithm (base 10) of the ionization constant (Ka) of the carboxylic species.

12. The method of claim 11 wherein the concentration of chlorine is controlled during the oxidation reaction to provide from about 1 to about 1.5 moles of chlorine for each mole of carboxylic species present in the solution.

13. The method of claim 11 wherein the carboxylic species is acetic acid or a water soluble salt thereof.

14. The method of claim 11 wherein the temperature of the aqueous solution ranges from about 90°C. to about the boiling point of the solution.

* * * * *

PO-1050
(5/69)

UNITED STATES PATENT OFFICE
CERTIFICATE OF CORRECTION

Patent No. 3,839,169      Dated October 1, 1974

Inventor(s) John R. Moyer

It is certified that error appears in the above-identified patent and that said Letters Patent are hereby corrected as shown below:

In "References Cited", delete "Meines" and insert --Meiners--.

Column 1, line 50, delete "chlorine" and insert --chloride--.

Column 1, line 53, delete "on" and insert --one--.

Column 2, line 20, delete "certain" and insert --contain--.

Column 7, line 56, delete "chloride" and insert --chlorine--.

Column 8, line 17, delete "chloride" and insert --chlorine--.

Column 8, line 34, before "metal" insert --earth--.

Signed and sealed this 18th day of February 1975.

(SEAL)
Attest:

RUTH C. MASON
Attesting Officer

C. MARSHALL DANN
Commissioner of Patents
and Trademarks